A. J. WANNER.
PISTON CONSTRUCTION.
APPLICATION FILED APR. 7, 1917.
1,238,602.
Patented Aug. 28, 1917.
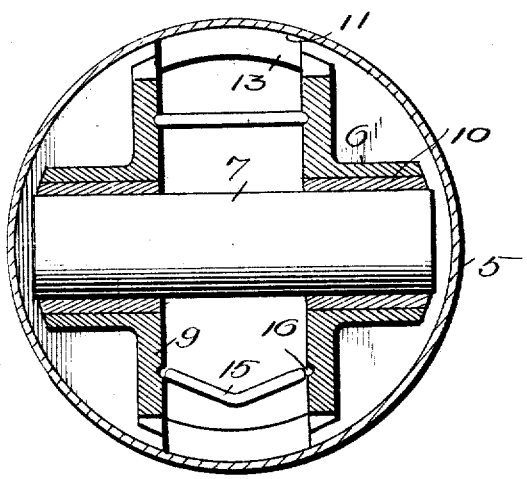
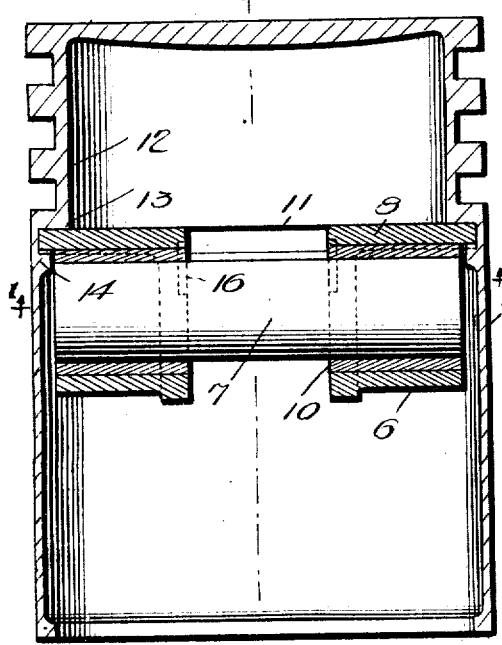
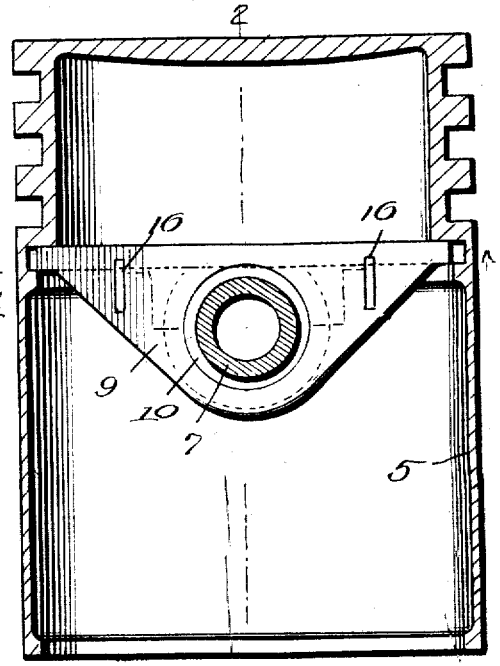
WITNESSES
F. C. Barry
W. E. Beck
INVENTOR
Albert J. Wanner
BY Munn & Co.
ATTORNEYS

UNITED STATES PATENT OFFICE.

ALBERT J. WANNER, OF EAST LIBERTY, OHIO, ASSIGNOR OF ONE-HALF TO VERNON LESLEY HARRIS, OF AKRON, OHIO.

PISTON CONSTRUCTION.

1,238,602.  Specification of Letters Patent.  Patented Aug. 28, 1917.

Application filed April 7, 1917. Serial No. 160,419.

*To all whom it may concern:*

Be it known that I, ALBERT J. WANNER, a citizen of the United States, and a resident of East Liberty, in the county of Summit and State of Ohio, have invented certain new and useful Improvements in Piston Construction, of which the following is a specification.

The principal object of my invention is to provide for improving and simplifying the construction and manufacture of pistons, particularly of the type used in internal combustion engines, by making the wrist pin bearings separate from the piston, means being provided for securing the bearings in place in the piston when assembling the piston and connecting rod. This arrangement allows of the wrist pin being secured within the piston, without the necessity of having openings bored in the piston walls for receiving the wrist pin, whereby the danger, heretofore incident to pistons of ordinary construction, of the wrist pin working out into engagement with the cylinder wall, is eliminated.

The invention is hereinafter fully described and illustrated in the accompanying drawing, in which like characters of reference indicate like parts throughout the several figures, of which—

Figure 1 represents a view taken transversely through a piston constructed in accordance with my invention, the view being taken on the plane indicated by the line 1—1 of Fig. 3, looking in the direction indicated by the arrows.

Fig. 2 represents a view in section taken longitudinally through the piston on the plane indicated by the line 2—2 of Fig. 3.

Fig. 3 represents a view in section taken longitudinally through the piston at right angles to Fig. 2, on the line 3—3 of Fig. 2.

Referring more particularly to the drawings, 5 indicates the piston which is in the form of a cylindrical cup having plain inner walls, the cylinder being devoid of the usual bosses or protuberances cast in pistons of usual construction, and which form the bearings for the wrist pin.

According to my invention the bearings 6 for the wrist pin 7, are each formed integrally with a segmental plate 8, the outer edge of which is curved on a line conforming with the curvature of the piston wall. Each of the plates 8 has one of the bearings 6 formed integrally with it on its under side, and the inner or adjacent ends of the bearings 6 are formed integrally with web portions 9 which lie in planes at right angles to the planes of the plates 8, and which serve to strengthen the bearings 6. Within the bearings may be inserted the sleeves 10 in which the wrist pin 7 is carried.

The outer ends of the sleeves 6 and of the web portion 9 terminate short of the outer curved edges of the plates 8, so that these edges are free to be inserted within a groove 11 cut in the inner surface of the piston walls, and extending entirely around the same. This groove 11, is in a plane at right angles to the axis of the piston, and it occurs at the lower end of the reduced or upper end portion 12 of the piston. Thus a shoulder 13 of relatively great width is defined at the upper edge of groove 11, while a shoulder 14 of lesser width than the shoulder 13 is defined at the lower edge of the groove. The dimensions of the plates 8 are such, that when these plates are moved radially of the piston toward each other, the edges of the plates will be withdrawn from the groove so as to allow these plates being moved out of the piston. In assembling the piston and the wrist pin, the pin is first engaged in the bearings of the plates, and the latter are then moved toward each other and then inserted within the piston and moved outwardly away from each other so that the edges of the plates will engage in the groove 11. This having been done, the bearings and plates will be in the position indicated in Fig. 2, and in order to brace the bearings apart and to maintain the plates 8 in seated position within the groove, the locking pins 15, in a bent condition, as shown in the lower portion of Fig. 1, are inserted between the opposed web portions 9, on opposite sides of the wrist pin, and are then straightened out to assume the position indicated at the upper portion of Fig. 1, whereby to brace the bearings apart and retain them in position within the piston.

The ends of the locking pins engage in recesses 16 provided in the opposing faces of the webs 9, so that when the pins are straightened out there will be no danger of their becoming accidentally disengaged or displaced from position.

The construction and arrangement I have provided, permits of the manufacture of the pistons at greatly reduced cost, and further results in an elimination of the danger incident to pistons of ordinary construction, of the wrist pin working into engagement with the cylinder wall. In the construction I provide, it will be noted that the wrist pin is entirely contained within the piston and that any longitudinal movement of the wrist pin will be stopped by the piston walls. In ordinary constructions in which openings through the piston walls are provided for the reception of the wrist pin, it has been found that at times the wrist pin works out into engagement with the cylinder wall with the result that the cylinder wall becomes cut and grooved.

Although I have described the preferred embodiment of my invention, I may desire to make such changes in the construction, combination and arrangement of parts thereof as do not depart from the spirit of the invention and the scope of the appended claims.

I claim:

1. The combination of a piston having an annular groove cut in the inner wall thereof, segmental plates arranged in a plane transverse to the axis of the piston and engaging at their curved edges in the groove, bearing sleeves formed on the under sides of the plates and adapted to receive a wrist pin, web portions formed integrally with and connecting the plates and sleeves, said web portions having opposed recesses formed on opposite sides of the bearing sleeves, and locking keys interposed between the web portion and engaging in the recesses.

2. The combination of a piston having an annular groove cut in its inner wall, segmental plates engaging at their curved edges in the groove, bearing sleeves carried by the plates for the reception of a wrist pin, and locking keys interposed between the plates for retaining them in engagement with the groove.

3. The combination of a piston having a groove cut in its inner wall, separate wrist pin bearings having portions for engaging in the groove, and locking keys interposed between the bearings for retaining them in engagement with the groove.

4. The combination of a piston, separate wrist pin bearings arranged in the piston, interengaging means between the bearings and the piston, for retaining the bearings in place within the piston, and means for locking the bearings and the piston in interengagement.

5. The combination with a piston, of separate wrist pin bearings, and means for detachably securing the latter in place within the piston.

ALBERT J. WANNER.